United States Patent
Nito

(10) Patent No.: US 7,679,235 B2
(45) Date of Patent: Mar. 16, 2010

(54) ENGINE STARTER WITH PROTECTIVE FUNCTION AGAINST OVER CURRENT

(75) Inventor: Kuniaki Nito, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/522,909

(22) Filed: Sep. 19, 2006

(65) Prior Publication Data

US 2007/0063597 A1    Mar. 22, 2007

(30) Foreign Application Priority Data

Sep. 20, 2005    (JP) ............................. 2005-271869

(51) Int. Cl.
*H02K 11/00* (2006.01)
(52) U.S. Cl. ..................... 310/68 C; 310/71
(58) Field of Classification Search ............... 310/68 C, 310/71
See application file for complete search history.

(56) References Cited

U.S. PATENT DOCUMENTS

| | | | | |
|---|---|---|---|---|
| 3,363,559 A | * | 1/1968 | Estes | 102/202.11 |
| 3,798,504 A | * | 3/1974 | Kreissl et al. | 361/31 |
| 3,877,142 A | * | 4/1975 | Hamano et al. | 29/596 |
| 5,949,320 A | * | 9/1999 | Cossins et al. | 336/223 |
| 6,008,555 A | * | 12/1999 | Garr et al. | 310/68 C |
| 6,028,381 A | * | 2/2000 | Yumiyama et al. | 310/68 C |

2005/0057046 A1    3/2005   Kitagawa et al.

FOREIGN PATENT DOCUMENTS

| | | | |
|---|---|---|---|
| CN | 1598286 A | | 3/2005 |
| DE | 19950956 A1 | * | 5/2000 |
| JP | 56015146 A | * | 2/1981 |
| JP | A 11-289724 | | 10/1999 |
| JP | A-2005-094892 | | 4/2005 |
| JP | A 2005-110484 | | 4/2005 |

OTHER PUBLICATIONS

Chinese Office Action; Patent Application No. 200610143758.6 filed Sep. 20, 2006; Issued Jul. 4, 2008.
Notification of Reasons for Rejection (with translation) for corresponding Japanese Application No. 2005-271869 dated Dec. 15, 2009.

* cited by examiner

*Primary Examiner*—Quyen Leung
*Assistant Examiner*—Alex W Mok
(74) *Attorney, Agent, or Firm*—Oliff & Berridge, PLC

(57) ABSTRACT

In a starter for starting an engine having a motor to which starting current is supplied from a battery, the motor has a field coil for forming a magnetic field with the supply of current, and the starter has wiring for supplying current from the battery to the field coil. The wiring has a cross section perpendicular to the longitudinal direction, which is smaller than a cross section perpendicular to the longitudinal direction of the winding of the field coil, so that a cross section reduction portion is integrated into the wiring. The cross section reduction portion functions as a fuse for shutting down an internal circuit of the motor at an earlier occasion when an overcurrent passes through the internal circuit.

18 Claims, 7 Drawing Sheets

ENGINE STARTER WITH PROTECTIVE FUNCTION AGAINST OVER CURRENT

CROSS-REFERENCE TO RELATED APPLICATION

This application is based on and claims the benefit of priorities from earlier Japanese Patent Application No. 2005-271869 filed on Sep. 20, 2005 the description of which is incorporated herein by reference.

BACKGROUND OF THE INVENTION

1. Technical Field of the Invention

The present invention relates to an engine starter (i.e. starter for engines), and in particular, to a technique for preventing overheating caused in a starter due to continuous current application to a motor possessed by the starter.

2. Related Art

A starter motor described in Japanese Unexamined Published Application No. 11-289724, for example, has a field coil which is connected in series with an armature coil through a brush and a commutator. The field coil is connected to a motor lead through a connector bar. In a starter motor having such a field coil, when a current is continuously supplied due to return failure of a key switch, for example, a problem has been raised that an insulating member in an armature is melted by heat generation in the motor to cause winding of the armature to be brought into contact with the ground or other electric conductor portions. In particular, the problem has been such that the winding, whose insulating member has been melted, unavoidably makes a short circuit between layers of the winding, or makes a short circuit extending to a grounding portion of a yoke or the like, with the result that a large short-circuit current keeps flowing to finally fuse the field coil and also having no control over when it will be fuse or which portion of the coil will be fused. A countermeasure for resolving this problem, i.e. a countermeasure for such abnormal circumstances as when excessively large thermal load is imposed on a starter motor, is to control so as to electrically disconnect a battery from the starter motor on an earlier occasion. Preferably, this fusing issue could occur at a predetermined fusing portion.

In the starter of the type mentioned above, however, resistance of both of a field coil and a connector bar is set at a small level. Therefore, heat generation is not drastic when a large current flows through them at the time of short-circuiting, and thus a circuit is fused only when a certain period of time has passed. In a state where a short-circuit current flows through a field coil, it is important to reduce the time of short-circuiting as much as possible for the sake of safety. To this end, one approach, for example, may be to increase resistance of the entire winding of a field coil for acceleration of heat generation to thereby fuse the winding of the field coil on an earlier occasion. This approach, however, causes other problems that the fused winding forms a short circuit with adjacent winding without providing complete disconnection, or that a certain period of time is required to achieve complete disconnection, or that output is reduced in the motor.

To resolve such problems, Japanese Unexamined Published Application No. 2005-110484 describes a stator motor, in which electrical connection is established between a motor lead for receiving current supply for engine start from a battery through a battery cable, and a metal intermediate member disposed in an internal circuit of the motor, so that, upon imposition of an excessively larger thermal load on the motor circuit than ordinarily used, a fuse function, i.e. a function of fusing the intermediate member is exerted to shut down the motor circuit. In order to improve the function as a fuse, the material of the intermediate member has selectively been iron, aluminum or tin, for so example, which has higher electrical resistance and lower thermal conductivity than wiring (typically a copper wire) connected to the intermediate member.

However, providing such an intermediate member, i.e. a member a starter originally did not have, raises some problems. For example, the number of parts is increased. Also, the number of steps is increased, such as, a step of welding the intermediate member to the wiring, or a step of applying a surface treatment (e.g., tin plating) to the intermediate member to improve weldability. Furthermore, design of some members other than the intermediate member have to be changed in order to ensure a space for accommodating the intermediate member.

SUMMARY OF THE INVENTION

The present invention has been made in light of these problems in the conventional art, and has an object of providing a starter having such a fusing function as to shut down an internal circuit of a motor on an earlier occasion when a short-circuit current passes through the internal circuit.

Further object of the present invention is to provide such a starter with good facility of design and assembling procedure.

The present invention provides a starter for starting an engine, the starter having a motor supplied a starting current from a battery, wherein the motor having a field coil which is supplied the starting current thereto so as to generate a magnetic field; the starter having a wiring which supplies the starting current to the field coil; and the wiring having an integrally formed portion of which cross section perpendicular to its longitudinal direction is less in area than that of a winding of the field coil, thus the portion functioning as a fuse.

Preferably, a pair of a length of this portion and an area of said cross section of this portion is determined so that this portion functions as a fuse which is fused in a predetermined fusing time.

Preferably, the wiring is a connector bar which connects the field coil and a motor lead which passes through the starting current.

Preferably, when the motor has a plurality of the field coils and a winding end of one of the field coils is connected to a winding end of another one of the field coils via a connecting wire, the wiring is the connecting wire.

DETAILED DESCRIPTION OF PREFERRED EMBODIMENTS

Hereinafter are described some embodiments of the present invention with reference to the accompanying drawings. Throughout the embodiments, like numerals indicate like components.

First Embodiment

Figure 1:
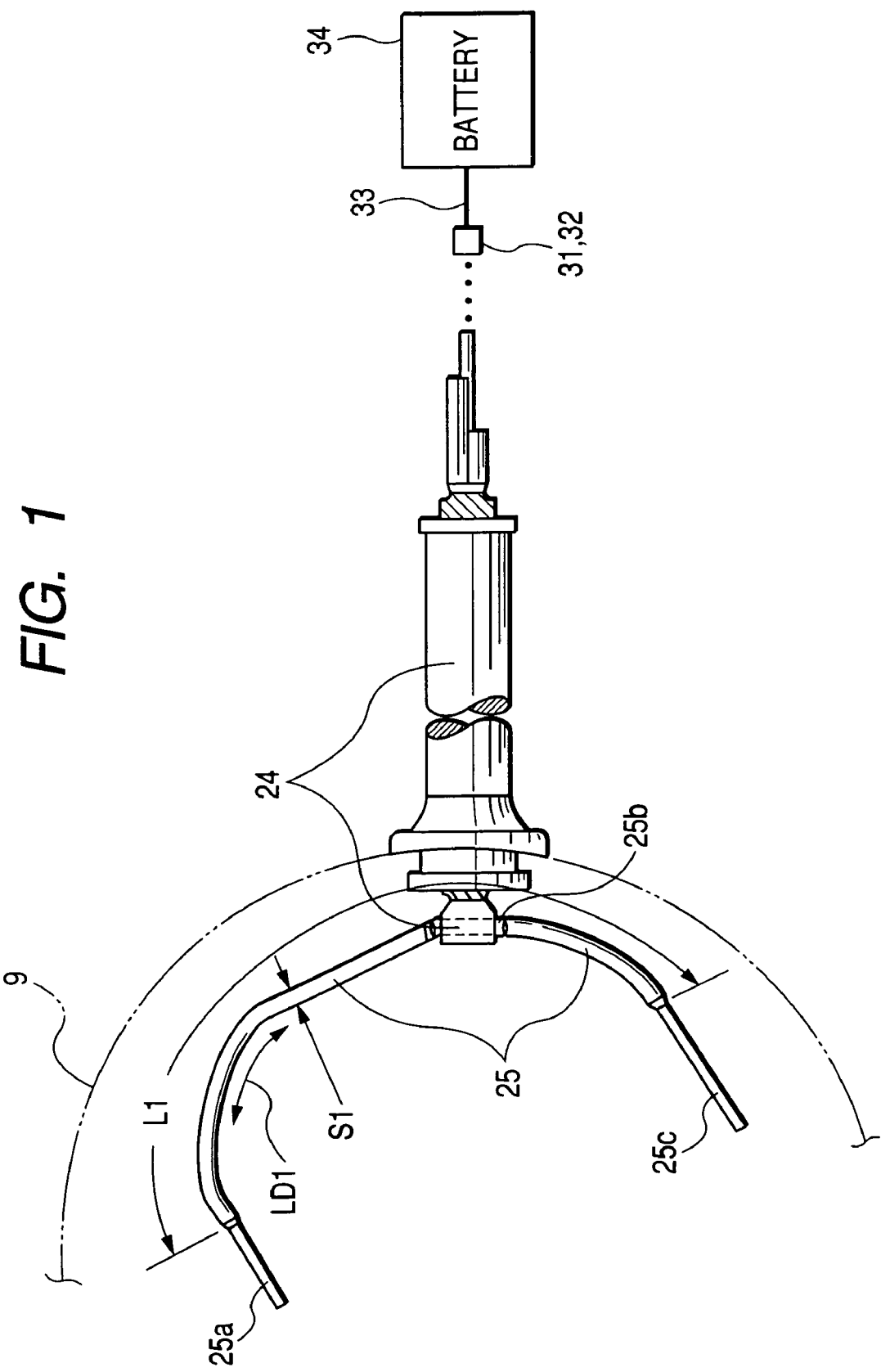
FIG. 1 is a plan view illustrating a connector bar and a motor lead in an engine starter in which a first embodiment of the present invention is implemented.
Figure 2:
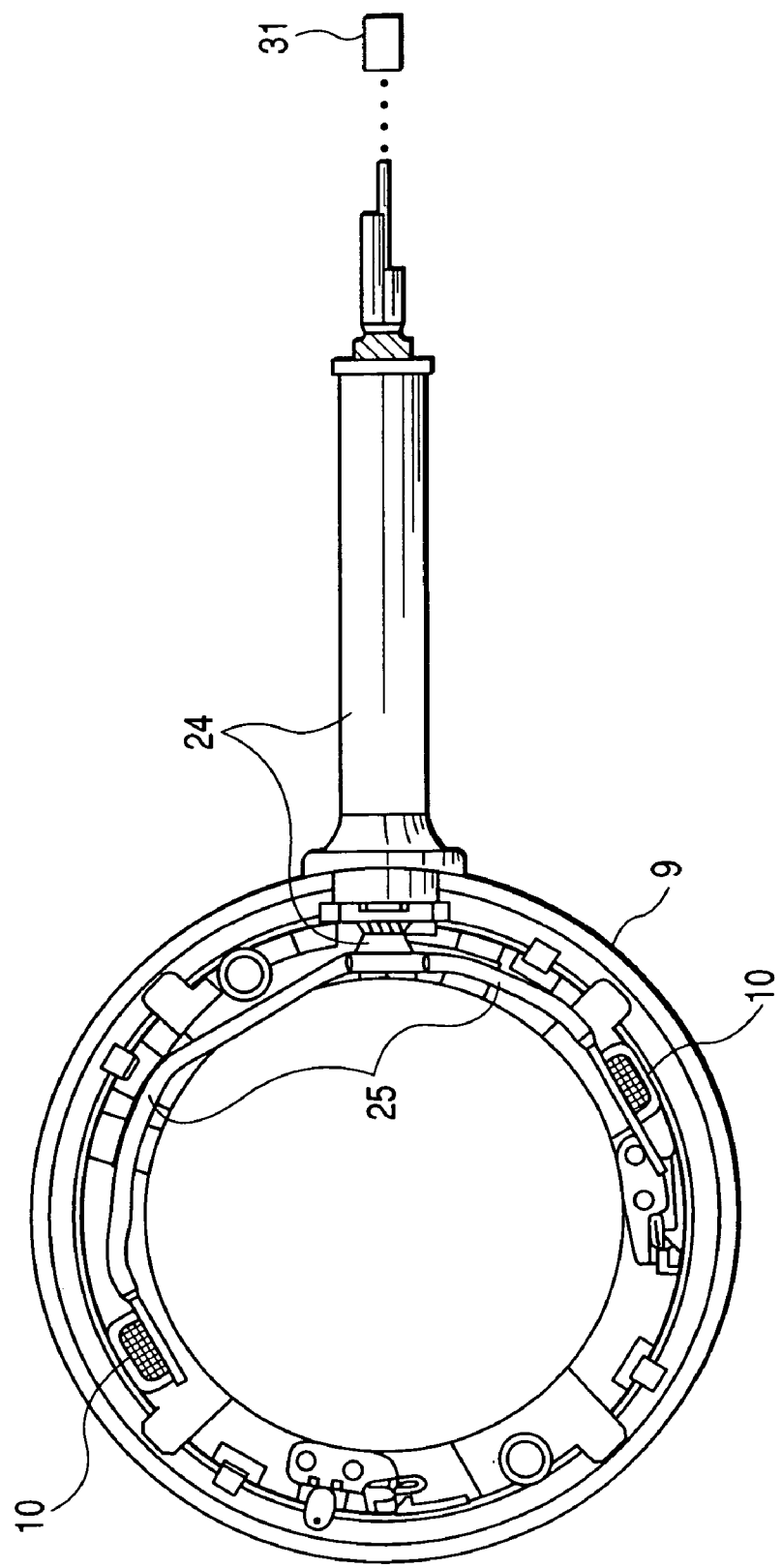
FIG. 2 is an axial plan view illustrating a yoke in which the connector bar according to the first embodiment is connected to a field coil.
Figure 3:
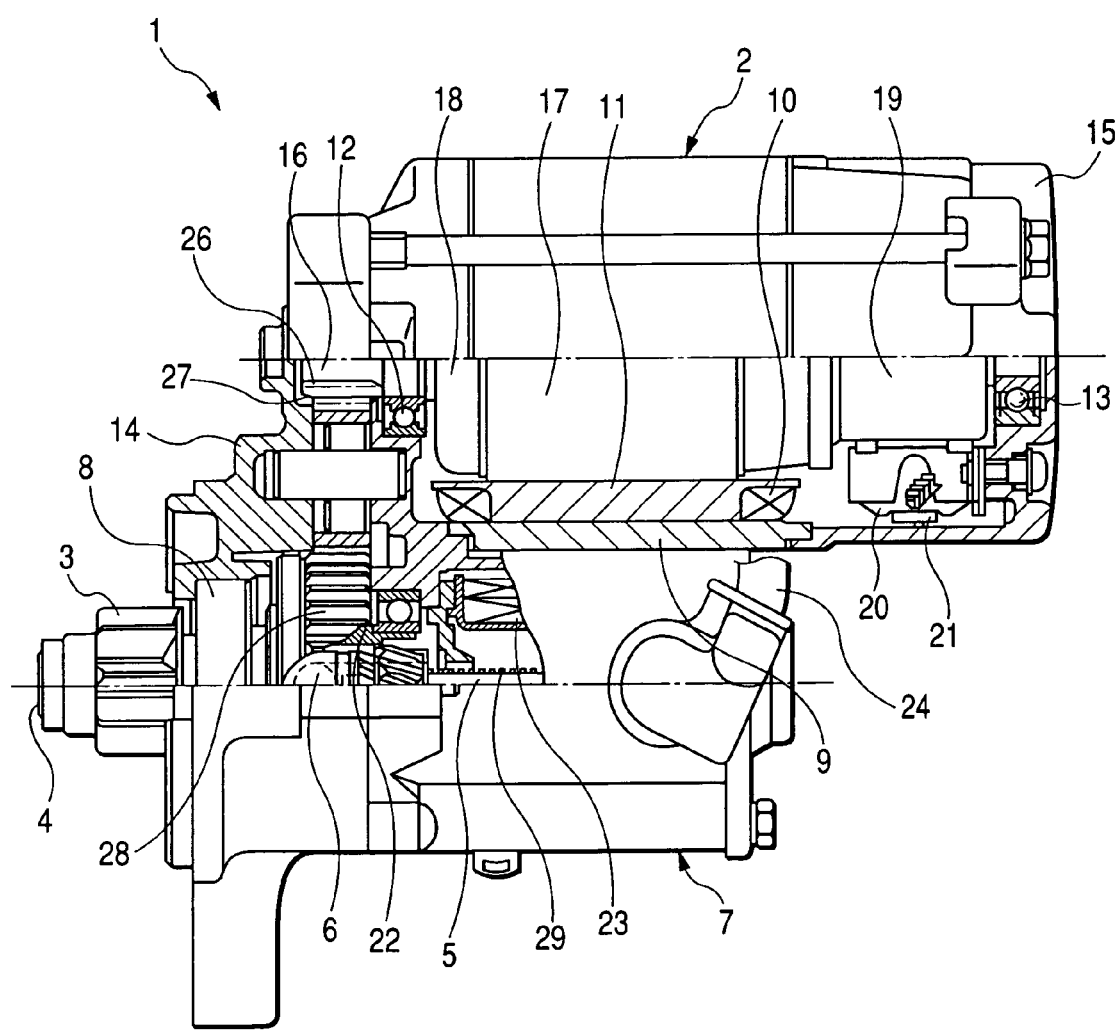
FIG. 3 is a side view including a partial cross section of the starter according to the first embodiment.

With reference to FIGS. 1 to 3, a first embodiment is described below.

(Arrangement)

As shown in FIG. 3, a starter 1 according to the first embodiment includes a motor 2, an electromagnetic switch 7, a speed reducer (described later) and a clutch 8. The motor 2 produces torque for an incorporated armature (described later). The electromagnetic switch 7 intermittently passes starting current from a battery 34 (see FIGS. 7A and 7B) to the motor 2 through an output shaft 4 for axially supporting thereon a pinion gear 3.

The electromagnetic switch 7 also has a function of pushing the output shaft 4 towards an engine (towards left of FIG. 3) through a rod 5 and a ball 6. The speed reducer reduces rotation of the motor 2, and the clutch 8 transmits the reduced rotation to the output shaft 4.

The motor 2 is a known DC motor that includes a field unit for forming a magnetic field, and an armature located at an inner periphery of the field unit. In the motor 2, torque is produced for the armature by an electromagnetic force that works on between the field unit and the armature.

The field unit is made up of a cylindrical yoke 9 forming a magnetic circuit, and a field coil 10 located at an inner periphery of the yoke 9, and forms a magnetic field when a starting current passes through the field coil 10. The field coil 10 is structured with winding being wound about a field pole 11 located at the inner periphery of the yoke 9. For example, such an arrangement may be provided in which four field coils 10 are provided, with each of the four field poles 11 being wound with a winding. It should be appreciated that the winding of the field coil may be structured by binding up a plurality of sub-windings.

The armature is made up of an armature coil 18 which is wound about an armature iron core 17, and a commutator 19 provided at one end (right of FIG. 3) of an armature shaft 16. The armature iron core 17 is press-fitted to an outer periphery of the armature shaft 16 which is rotatably supported by a front housing 14 and an end frame 15 through a pair of bearings 12 and 13 so as to achieve serration fitting.

The commutator 19 is made up of a plurality of commutator segments which are supported by a mold resin (not shown) at a circumference of the armature shaft 16 and are circumferentially and cylindrically arranged with an even interval therebetween. A plurality of carbon brushes 20 are arranged at an outer circumference of the commutator 19, and are pressed against the commutator 19 by a brush spring 21.

The brush 20 is provided with two positive-side brushes 20a which are connected to the field coil 10, and two negative-side brushes 20b which are grounded, for example, to the yoke 9.

The output shaft 4 is coupled to a spline tube 22 forming an inner ring of the clutch 8 to establish helical spline coupling therebetween and is made movable in the axial direction with respect to the spline tube 22 (left and right directions in FIG. 3). A return spring 29 is disposed between the spline tube 22 and the output shaft 4, for pressing back the output shaft 4 which has been pressed forward (direction towards left in FIG. 3) at the time of engine start. The pinion gear 3 establishes spline coupling with an end of the output shaft 4 which is projected forward from the front housing 14 so as to integrally rotate with the output shaft 4. The electromagnetic switch 7 includes an exciting coil 23 to which current is supplied from the battery 34 when a key switch (not shown) is turned on to form an electromagnet, a plunger (not shown) which is inserted into the inside of the exciting coil 23 and attracted to the electromagnet to move to the left direction of FIG. 3, and a motor contact which is opened/closed according to the movement of the plunger.

The motor contact includes a movable contact 32 (see FIGS. 7A and 7B) which is integrally movable with the plunger or is interlocking with the movement of the plunger, and a pair of fixed contacts 31 (see FIGS. 7A and 7B) which is connected to a current supply circuit of the motor 2. The motor contact is brought into a closed state when the movable contact 32 comes into contact with both of the fixed contacts 31 to become conductive, and brought into an open state when the movable contact 32 is separated from both of the fixed contacts 31 to shut down the conductivity between the two fixed contacts 31. Of the pair of fixed contacts 31, one fixed contact 31 is connected to the In-vehicle battery 34 (power source 34) through a battery cable 33 (see FIGS. 7A and 7B), and the other fixed contact 31 is connected, as shown in FIG. 2, to a connector bar 25 through a motor lead 24.

The connector bar 25 is a component which establishes electrical connection between the motor lead 24 and the four field coils 10 and is made up of, for example, of a copper rod member having a circular cross section which is provided being bent. As shown in FIG. 1, flat connections 25a and 25c are formed at both ends of the connector bar 25 so as to be connected to the field coils 10, with a flat connection 25b being formed between the connections 25a and 25c.

In the first embodiment, the length (L1) of the connector 25 is 80 mm. The connector bar 25 has, over the length thereof, a cross section (S1) perpendicular to the longitudinal direction (LD1) of the connector bar 25, which is less than one half of a cross section (S0) perpendicular to the longitudinal direction (LD0) of a winding (WG) of each field coil 10. In other words, a cross section reduction ratio (S1/S0) of the connector bar 25 with respect to the cross section (S0) of the winding (WG) of the field coil 10 is 50% or more.

The cross section reduction portion here is defined as "a portion of a wiring (current-relaying element) where a cross section (e.g. S1, S2) perpendicular to longitudinal direction (e.g. LD1, LD2) of the wiring (current-relaying element) is averagely smaller than a cross section (S0) perpendicular to longitudinal direction (LD0) of a winding (WG) of a field coil, wherein the wiring (current-relaying element) is defined as "any of each wiring (current-relaying element) which supplies starting current from a battery (power source) to a field coil."

The cross section reduction ratio here is defined as "a ratio of a cross section of an above defined cross section reduction portion of a wiring with respect to a cross section perpendicular to the longitudinal direction of the winding of a field coil."

The speed reducer includes a drive gear 26 formed at an end on a front side of the armature shaft 16, an idle gear 27 which engages with the drive gear 26, and a clutch gear 28 which engages with the idle gear 27. Speed is reduced by sequentially transmitting the rotation of the armature shaft 16 from the drive gear 26, through the idle gear 27 to the clutch gear 28.

The clutch 8 transfers the rotation transferred to the clutch gear 28 to the spline tube 22. The clutch 8 constitutes a one-way clutch which interrupts power transmission from the spline tube 22 to the clutch gear 28 once a rotational speed of the spline tube 22 exceeds that of the clutch gear 28 upon starting of an engine.

(Operation Under Normal Condition)

With reference to FIG. 3, starter operation under normal condition, i.e., in case of no excess current supplied to the motor 2, of a first embodiment is described below. When the key switch is turned on, current is supplied to the field coil 23 of the electromagnetic switch 7 to form an electromagnet. Then, the plunger moves being attracted by the electromagnet to thereby push the output shaft 4 forward to a front side (engine side) through the rod 5 and the ball 6, whereby the pinion gear 3 axially supported on the output shaft 4 is stopped by being in contact with a ring gear (not shown) of the engine.

On the other hand, when a motor contact is closed by the movement of the plunger, current is supplied to the motor 2 from the battery through the electromagnetic switch 7. Then, electromagnetic force works on between the field unit and the armature, whereby the armature starts rotation.

Being reduced by the speed reducer, the rotation of the armature is transferred to the output shaft 4 through the clutch 8 to rotate the output shaft 4. When the output shaft 4 is rotated, the pinion gear 3 rotates up to a position that enables engagement with the ring gear. Upon engagement of the pinion gear 3 with the ring gear, the rotation of the output shaft 4 is transferred from the pinion gear 3 to the ring gear to rotate a crankshaft (not shown) of the engine.

When the key switch is turned off after the engine is started, current supply to the exciting coil 23 is stopped to eliminate the attractive force of the electromagnet. Then, the output shaft 4 is pushed back receiving the reactive force of the return spring 29 (see FIG. 3), so that the pinion gear 3 is disengaged from the ring gear, and the plunger is pushed back to the initial position by the reactive force of the return spring 29. As a result, the motor contact is opened to stop the current supply from the battery to the motor 2.

(Operation Under Abnormal Condition)

Starter operation under abnormal condition of a first embodiment will be described below. That is how the cross section reduced portion of the connector bar 25 functions when overcurrent is supplied to the motor 2.

Figure 8:
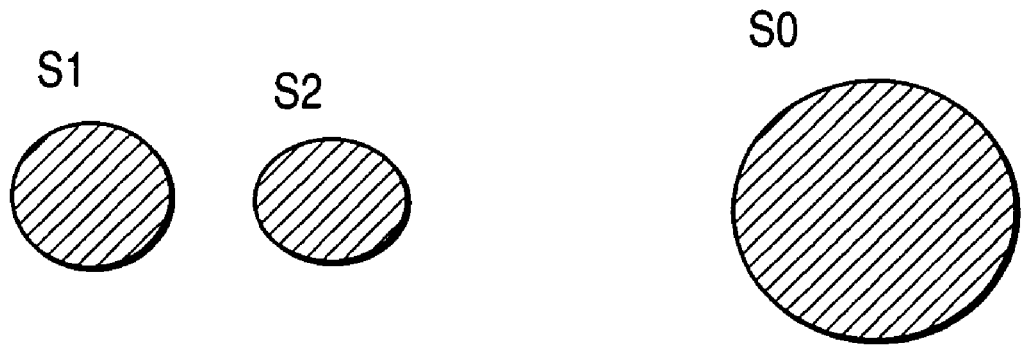
FIG. 8 is a schematic view illustrating a cross section of a connector bar (S1), that (S2) of a connecting wire (S2), and that (S0) of a field coil.

When current is continuously supplied to the motor 2 due, for example, to return failure of the key switch or welding of a starter relay, not shown, in the motor 2 of the first embodiment described above, a reduction ratio (S1/S0) of the cross section (S1) of the connector bar 25 relative to the cross section (50) of the winding (WG) of the field coil 10 is set to be 50% or more throughout the length of the connector bar 25. (FIG. 8) Therefore, Jule heat generated at the cross section reduction portion of the connector bar 25 (in this case, the full length of the connector bar 25) becomes large, so that the cross section reduction portion of the connector bar 25, with its temperature being effectively raised up, is fused in short time.

(Fusing Time of Fuse Portion, Experimental Results)

Figure 4:
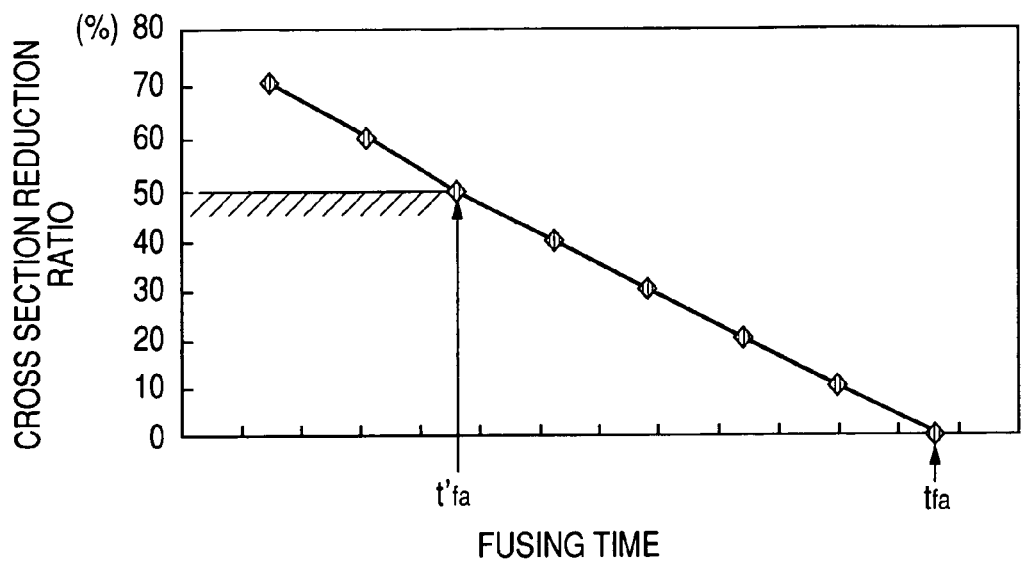
FIG. 4 is a graph showing results of measurements, i.e. relation between cross section reduction rate and fusing time of the connector bar according to the first embodiment.
Figure 5:
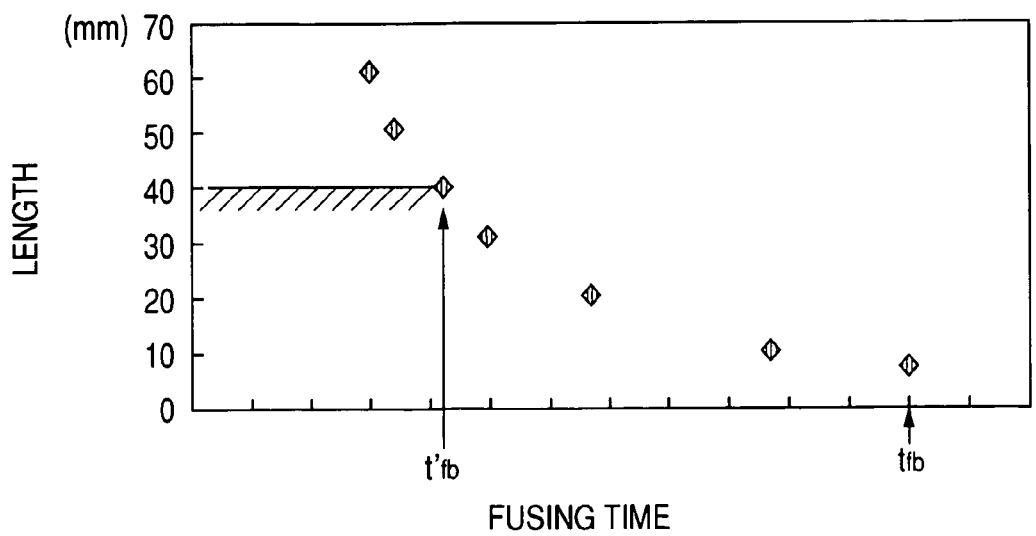
FIG. 5 is a graph showing results of measurement, i.e. relation between length of a cross section reduction portion and fusing time of the connector bar according to the first embodiment.

With reference to FIGS. 4 and 5, experimental results concerning the fusing properties (fusing time of the cross section reduction portion) of the fuse portion (the cross section reduction portion, section-reduced portion) are explained below. In the experiments, the connector bar 25, whose length (L1) is 80 mm, was used. The experiments were made aiming at improving the fusing time to one third or less of the fusing time of the conventional item.

(Dependency of Fusing Time on Reduction Ratio)

FIG. 4 shows the experimental results concerning dependency of the fusing time of the cross section reduction portion of the connector bar 25 (fuse portion) on the cross section reduction ratio (S1/S0), with respect to the cross section (S0) of the winding (WG) of the field coil 10. According to the experiments, where the cross section reduction ratio was allowed to be 50% or more, it resulted that, comparing with the conventional item in which a cross section of the winding of the field coil 10 is equal to the cross section of the connector bar 25, the fusing time t'fa of the connector bar 25 could be reduced to about one third or less of the fusing time tfa of the conventional item.

However, where the length of the cross section reduction portion (fuse portion) is small, the amount of heat conduction to both ends of the fuse portion in the longitudinal direction, i.e. the motor lead 24 connected to the connector bar 25 and the field coil 10, is greater than the amount of heat generated at the fuse portion. As a result, temperature of the fuse portion is not raised sufficiently high. Thus, it is expected that the time for achieving fusing of the connector bar 25 is increased, or a fusing temperature may not be reached. Under such circumstances, the experiments were performed to examine dependency of the fusing time of the fuse portion on the length of the fuse portion. The results are shown in FIG. 5.

(Dependency of Fusing Time on Length)

FIG. 5 shows the experimental results concerning dependency of the fusing time of the cross section reduction portion of the connector bar 25 (fuse portion) on the length (L1) thereof.

As can be seen from FIG. 5, according to the experiments, it resulted that, where the cross section reduction ratio was 50%, the fusing time t'fb of the connector bar 25 was reduced to about one third or less of the fusing time tfb of the conventional structure item, by setting the length of the fuse portion to 40 mm or more (In other words, more than one half of the entire length of the connector bar 25.).

Further, when the length of the fuse portion was set to about 10 mm, the fusing time was approximately the same as that of the conventional structure item. When the fuse portion was further elongated, the fusing time tended to exponentially reduce. With the length of 20 mm, the fusing time of the fuse portion was about one half of the conventional item, and with 40 mm, about one third of the conventional item. When the length of the cross section reduction portion was 40 mm or more, the effects of reducing fusing time tended to become slightly smaller by the amount of an increment in the length, but still, increase in the length of the cross section reduction portion could reduce the fusing time. Accordingly, in order to have the cross section reduction portion functioned as an effective fuse having shorter fusing time, the length of the cross section reduction portion is required to be longer than 10 mm, preferably 20 mm or more, and more preferably 40 mm or more.

(Summary of Experiments)

In this way, a pair of the cross section reduction ratio and length of the connector bar 25 can be determined so that the fusing time of the fuse portion (the cross section reduction portion) becomes equal to or less than a desired value (here, about one third or less of the conventional item).

(Drawbacks)

An influence on motor output brought by providing the fuse portion to the connector bar 25, is small comparing with the case where the fuse portion is provided to the field coil 10, i.e. where the cross section of the winding is reduced throughout the entire length of the winding of the field coil 10. According to the experiments, it was revealed that, in case of the first embodiment, output reduction ratio was reduced by only about 1%, and little influence was given to the engine startability.

(Advantages)

As explained above, when an extraordinary overcurrent is supplied to the starter, the cross section reduction portion of the connector bar 25 can function as an effective fuse to promptly and reliably shut down the internal circuit of the motor 2.

Furthermore, it should be appreciated that the cross section reduction portion described above is integrated into the connector bar 25 without inserting, for example, an intermediate member into a portion of the connector bar 25 (in the first embodiment, the cross section reduction portion is formed over the full length). Therefore, the number of processes is not increased in a starter assembling procedure due to the provision of the cross section reduction portion. If the fuse portion is formed using an intermediate member different from the connector bar, a process, for example, for welding the connector bar and the intermediate member, or a process for giving a surface treatment to the intermediate member to increase the welding intensity of the welding portion, has to be added. Further, since the cross section of the cross section reduction portion is smaller than the cross section of the connector bar 25 before formation of the cross section reduction portion, a space for accommodating the connector bar 25 is not required to be newly prepared, and also no change of design is required for starter members other than the connector bar 25.

Second Embodiment

Figure 6:
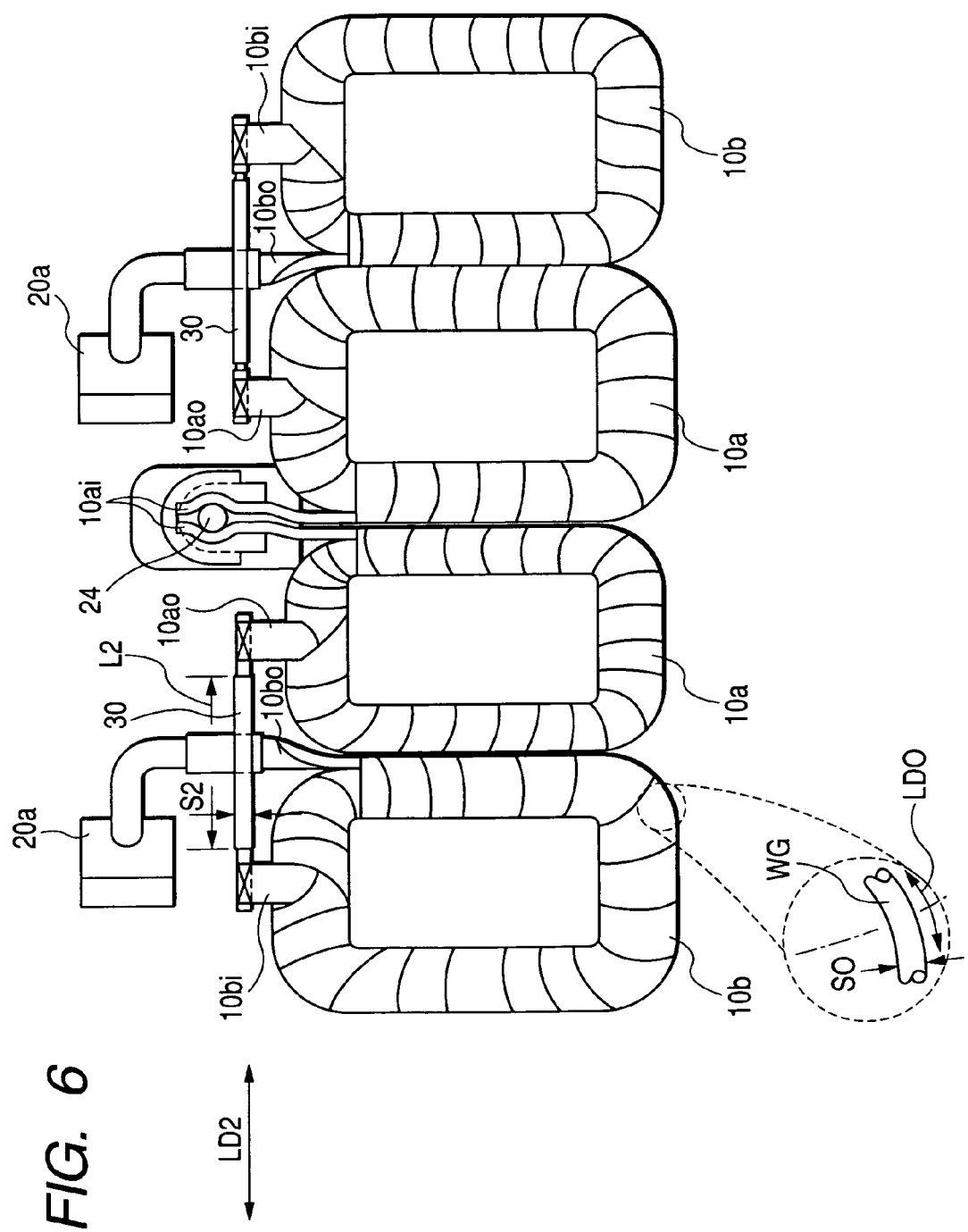
FIG. 6 is a development view of a field coil connected through a connecting wire in an engine starter in which a second embodiment of the present invention is implemented.

Hereinafter is described a second embodiment of the present invention with reference to FIG. 6. FIG. 6 is a development view of a field coil 10 in which a first field coil 10*a* and a second field coil 10*b* are connected through a connecting wire 30. The motor 2 of the second embodiment provides one example in which a cross section reduction portion (fuse portion, section-reduced portion) is provided to the connecting wire 30 that connects between the first field coil 10*a* and the second field coil 10*b*. The connecting wire 30 connects in series the first field coil 10*a* to the second field coil 10*b*. Specifically, one end of the first field coil 10*a* is electrically connected to one end of the second field coil 10*b* through the connecting wire 30. The other end of the first field coil 10*a* is connected to the motor lead 24 and the other end of the second field coil 10*b* is connected to the positive-side brush 20.

The connecting wire 30 is formed so that its cross section (S2) over the entire length is one half or less of the cross section (S0) of the winding (WG) of the field coil 10. In other words, a reduction ratio (S2/S0) of the cross section (S2) of the connecting wire 30 with respect to the cross section (S0) of the winding of the field coil 10 is 50% or more. The connecting wire 30 has a length (L2) of 40 mm or more from a connection to the first field coil 10*a* to a connection to the second field coil 10*b*. Thus, in case a large short-circuit current (several hundreds of amperes, for example) passes through the field coil 10 and the connecting wire 30 due to continuous current supply to the motor 2, the connecting wire 30 whose cross section (S2) is smaller than that (S0) of the winding (WG) of the field coil 10 (FIG. 8) is fused in short time (20 seconds or less according to experiments) to promptly and reliably shut down the internal circuit of the motor 2.

Results of experiments similar to the ones in the first embodiment show that, when the length of the fuse portion of the connecting wire 30 becomes longer than 40 mm, the effect of reducing the fusing time by lengthening its length becomes slightly poor. In contrast, when the length of the connecting wire 30 is made smaller than 40 mm, it tended that the effect of reducing the fusing time by lengthening its length was relatively better. In this way, this result showed the tendency similar to the one obtained in the first embodiment (FIG. 5).

As explained above, when an extraordinary overcurrent is supplied to the starter, the cross section reduction portion of the connecting wire 30 can function as an effective fuse to promptly and reliably shut down the internal circuit of the motor 2.

It should be appreciated that the cross section reduction portion is characterized in that the portion is integrated into the connecting wire 30 without inserting an intermediate member into a portion of the connecting wire 30, for example (in the second embodiment, the cross section reduction portion is formed over the full length of the connecting wire 30). Accordingly, unlike the case where a fuse portion is formed of an intermediate member, the number of processes is not increased in a starter assembling procedure due to the provision of the cross section reduction portion. Further, since the cross section of the cross section reduction portion is smaller than the cross section of the connecting wire 30 before formation of the cross section reduction portion, a space for accommodating the connecting wire 30 is not required to be newly prepared, and also no change of design is required for starter members other than the connecting wire 30.

(Modifications)

In the connector bar 25 of the first embodiment, the cross section of the portions other than the connections 25*a* and 25*b* has a circular shape. However, the cross section is not limited to the circular shape, but may have a rectangular shape or a square shape, for example. The connector bar 25 may rather have a hollow structure to effectively reduce the cross section. Similarly, the shape of the cross section of the connecting wire 30 of the second embodiment may be appropriately selected, such as a circular shape, rectangular shape or a square shape.

In the first embodiment, the cross section of the connector bar 25 over its entire length is made smaller than the cross section of the winding of the field coil 10. However, as far as the cross section reduction portion (fuse portion) is ensured to have not less than a predetermined length that functions as a fuse having fusing properties (e.g., reduction ratio of fusing time) desirable for the cross section reduction portion, the cross section of the portions other than the fuse portion may be equal to that of the conventional item. Similarly, in the second embodiment, as far as the cross section reduction portion (fuse portion) of the connecting wire 30 is ensured to have not less than a predetermined length that functions as a fuse having fusing properties (e.g., fusing time) desirable for the cross section reduction portion, the cross section of the portions other than the fuse portion may be equal to that of the conventional item. The cross section reduction portion does not necessarily have to have the same cross section throughout its entire length, but may only have a cross section effective for realizing the desirable fusing properties. Further, the length of the cross section reduction portion and combination of cross sections may only have to be determined so that the fuse portion may have the desirable fusing properties.

The desirable fusing properties of the cross section reduction portion in the first embodiment have included that the fusing time is about one third or less of the conventional item, and those in the second embodiment have included that the fusing time is 20 seconds or less. However, in the present invention, the desirable properties of the cross section reduction portion should not be limited to such fusing time of about one third or less of the conventional item or 20 seconds or less.

Figure 7A:
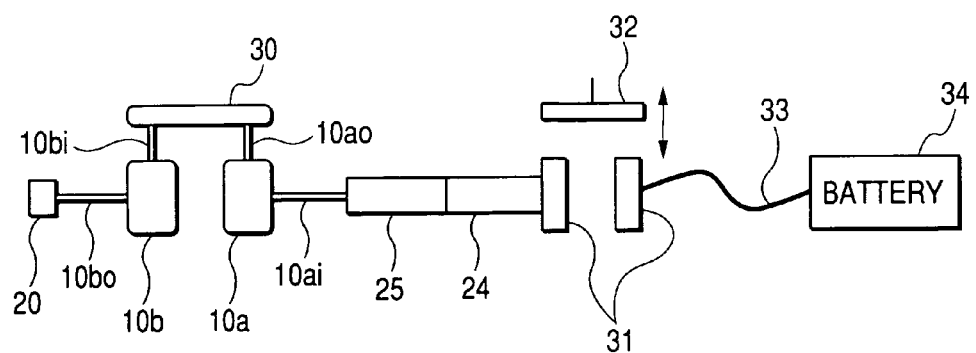
FIG. 7A is a schematic view illustrating an entire arrangement of wiring for supplying current from a battery to a field coil, according to the first embodiment.
Figure 7B:
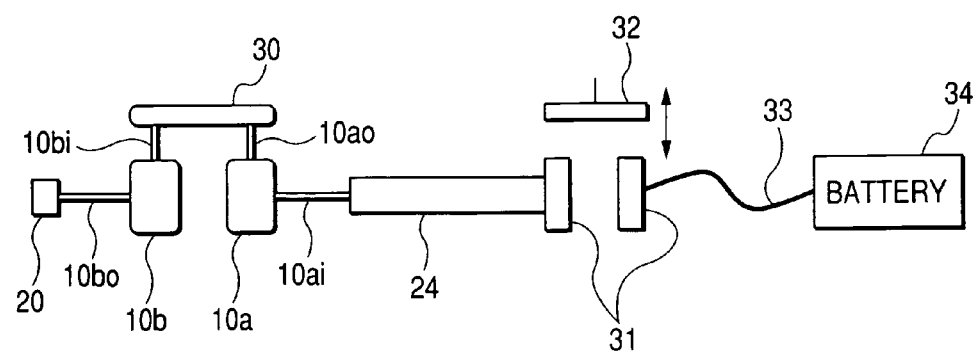
FIG. 7B is a schematic view illustrating an entire arrangement of wiring for supplying current from a battery to a field coil, according to the second embodiment.

Finally, FIGS. 7A and 7B show general arrangements of the wiring for supplying current from the batteries to the field coils in the first and second embodiments, respectively. In the first and second embodiments, the cross section reduction portions have been provided to the connector bar 25 and the connecting wire 30, respectively, for functioning as fuses. However, the cross section reduction portions may be provided to portions (current-relaying elements) other than the connector bar 25 and the connecting wire 30, such as portions (current-relaying elements) of the battery cable 34, pull-out leads 10$ai$ and 10$ao$ of the field coil 10$a$, or leads 10$bi$ and 10$bo$ of the field coil 10$b$.

In order to explain the manner in which the present invention exerts advantages, specific starters have been described above, in each of which a fuse is integrated into the wiring (current-relaying elements). It will be appreciated, however, that the present invention is not limited to these starters, but any and all modifications, variations or equivalent arrangements, which may occur to those who are skilled in the art, should be considered to fall within the scope of the present invention.

What is claimed is:

1. A starter for starting an engine, comprising:
    a motor equipped with at least one field coil receiving a starting current from a power source to energize the at least one field coil so as to generate a magnetic field; and
    a current-relaying element being disposed to form at least part of an electric path connecting the at least one field coil and the power source and having a section-reduced portion of which cross section area is less than a cross section area of a winding composing said at least one field coil, the cross section area of the section-reduced portion being decided to cause the section-reduced portion to function as a fuse against an excessive amount of the starting current, wherein:
    said current-relaying element is a connector bar which connects said at least one field coil and a lead of the motor;
    a part of the connector bar is connected to the lead of the motor;
    one end portion of the connector bar is connected to a first field coil and another one end portion of the connector bar is connected to a second field coil;
    one side of the connector bar is longer than another side of the connector bar on a basis of the connecting part connected to the lead; and
    the section-reduce portion is located on the one side of the connector bar and the another side of the connector bar.

2. The starter according to claim 1, wherein said section-reduced portion has a length equal to or longer than a half length of said connector bar.

3. The starter according to claim 2, wherein said section-reduced portion has a length equal to or longer than 40 mm.

4. The starter according to claim 2, wherein said cross section area of said section-reduced portion of said connector bar is equal to or less than a half area of the cross section area of said winding composing said at least one field coil.

5. The starter according to claim 4, wherein said section-reduced portion of said connector bar has a length equal to or longer than 40 mm.

6. The starter according to claim 1, wherein said section-reduced portion has a section area equal to or less than half an area of the cross section of said winding composing said at least one field coil.

7. The starter according to claim 6, wherein said section-reduced portion has a length longer than 10 mm.

8. The starter according to claim 7, wherein said section-reduced portion is integrally formed with said connecting wire.

9. The starter according to claim 6, wherein the length of said section-reduced portion is equal to or longer than 20 mm.

10. The starter according to claim 6, wherein the length of said section-reduced portion is equal to or longer than 40 mm.

11. The starter according to claim 6, wherein said section-reduced portion is integrally formed with said connecting wire.

12. The starter according to claim 1, wherein the length of said section-reduced portion and an area of said cross section of said section-reduced portion are determined to cause said section-reduced portion function as the fuse which works in a predetermined time interval against an amount of the starting current is over then the predetermined amount.

13. A starter for starting an engine, comprising:
    a motor equipped with a field coil receiving a starting current from a power source to energize the field coil so as to generate a magnetic field; and
    a current-relaying element being disposed to form at least part of an electric path connecting the field coil and the power source and having a section-reduced portion of which a cross section area is less than a cross section area of a winding composing said field coil, the cross section area of the section-reduced portion being decided to cause the section-reduced portion to function as a fuse against an excessive amount of the starting current,
    wherein:
    said field coil is composed of a plurality of field coils and said connecting wire is composed of a plurality of connecting wires,
    an end of one of first field coils is connected to an end of one of second field coils via a first connecting wire,
    an end of another one of first field coils is connected to an end of another one of second field coils via a second connecting wire, and
    said section-reduced portion is integrally formed with said connecting wire.

14. The starter according to claim 13, wherein said section-reduced portion has a length equal to or longer than a half length of said connecting wire.

15. The starter according to claim 14, wherein said section-reduced portion has a length is equal to or longer than 40 mm.

16. The starter according to claim 14, wherein said cross section area of said section-reduced portion of said connecting wire is equal to or less than half area of the cross section of said winding composing said field coil.

17. The starter according to claim 16, wherein said section-reduced portion of said connecting wire has a length equal to or longer than 40 mm.

18. The starter according to claim 13, wherein the length of said section-reduced portion and an area of said cross section of said section-reduced portion are determined to cause said section-reduced portion to function as the fuse which works in a predetermined time interval against an amount of the starting current is over then the predetermined amount.

* * * * *